United States Patent

Rosenthal

[15] 3,642,064
[45] Feb. 15, 1972

[54] APPARATUS FOR SEALINGLY BLOCKING A CONDUIT

[72] Inventor: Wayne O. Rosenthal, Fort Worth, Tex.

[73] Assignee: Gearhart-Owen Industries, Inc., Fort Worth, Tex.

[22] Filed: Feb. 19, 1970

[21] Appl. No.: 12,733

[52] U.S. Cl. ............................................166/134, 166/135
[51] Int. Cl. .....................................................E21b 33/129
[58] Field of Search.................166/132, 118, 120, 134, 135, 166/192, 193, 195, 206

[56] References Cited

UNITED STATES PATENTS

| | | | |
|---|---|---|---|
| 1,641,741 | 9/1927 | Davis et al. | 166/135 |
| 2,856,002 | 10/1958 | True et al. | 166/135 X |
| 3,250,331 | 5/1966 | Boyle | 166/135 X |
| 2,228,630 | 1/1941 | Kail | 166/135 X |
| 2,966,946 | 1/1961 | McCulloch et al. | 166/135 X |
| 3,091,294 | 5/1963 | Evans et al. | 166/135 |
| 3,120,269 | 2/1964 | Evans et al. | 166/120 |
| 1,670,964 | 5/1928 | Hay et al. | 166/132 |

*Primary Examiner*—David H. Brown
*Attorney*—Wofford and Felsman

[57] ABSTRACT

Apparatus for sealingly blocking a conduit characterized by a liner having a cylindrical annular body sealingly engaging the conduit and defining a cylindrical internal passageway and an internal sealing plug adapted to pass within the passageway, to seal it, and to provide retainer means to prevent movement of the plug from within the liner regardless of whether pressure is above or below the plug. The sealing plug is further characterized by having a body portion to pass within the passageway within the liner and substantially block the passageway; a seal extending annularly around the body portion and adapted for sealingly engaging the liner and the body portion for sealing any annular passageway therebetween; upper and lower retainers for preventing movement of the sealing plug despite a force on either side. The lower retainer may be eccentrically mounted dogs that are moved by gravity into a retaining position to protrude beyond the periphery of the sealing plug and retain the plug within the liner but adapted to cam inwardly for passage through the liner. The upper retainer may be a ring releasably connected to the body portion and adapted to engage the top of the liner to resist downward movement. Details of construction of the respective elements are also disclosed.

7 Claims, 4 Drawing Figures

PATENTED FEB 15 1972 3,642,064

INVENTOR
Wayne O. Rosenthal
BY
Wofford & Felsman
ATTORNEYS

APPARATUS FOR SEALINGLY BLOCKING A CONDUIT

BACKGROUND OF THE INVENTION

1. Field of the Invention

This invention relates to apparatus for sealingly blocking a conduit. More particularly, it relates to apparatus generally referred to as sealing plugs for sealingly blocking a conduit penetrating subterranean formations.

2. Description of the Prior Art

A wide variety of devices for sealingly blocking a conduit are known in the prior art. The devices range from downhole valves which shut in the conduit upon the occurrence of a given condition; such as high or low pressure; through packoff devices, generally referred to as packers, that may be setable by mechanical operation such as a jar or a spaghetti string from the surface, or by fluid pressure; to permanent plugs such as plugs of cement or plugs or seats therefor emplaced between joints of the conduit as the conduit is assembled for being lowered into the well bore. Such prior art devices have suffered two major defects in that: (1) they have required a high degree of preplanning so as to be properly emplaced, since they were permanent in nature, could not be readily removed, or required preplaced seats; or (2) they were complex and expensive in structure and operation, and required leaving complex and expensive apparatus in the conduit.

DESCRIPTION OF THE PREFERRED EMBODIMENT(S)

It is a primary object of this invention to obviate the disadvantages of the prior art devices for sealing a passageway in a conduit by providing apparatus that can be readily emplaced at any location, or depth, in the conduit and also avoids leaving complex and expensive apparatus in the conduit. In addition to the foregoing object, it is a specific object of this invention to provide a sealing plug that can be emplaced at a desired location simply by flowing it into the conduit and into its seat yet, will resist movement in either direction once emplaced.

While the apparatus of the invention may be employed to sealingly block any conduit, it has been designed for and has particular utility for use in a conduit penetrating subterranean formations. Accordingly, it will be described with respect to being emplaced in a conduit such as tubing or casing penetrating via a borehole subterranean formation. Consequently, the directions of "up" and "down" in the descriptive matter will be given with respect to depth in the borehole, but it is to be realized that such directions are relative; for example, downward being the direction in which the sealing plug is inserted into the liner.

Figure 1:
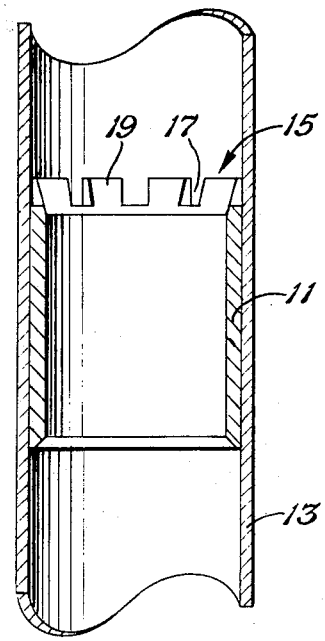
FIG. 1 is a partial cross sectional view showing a liner emplaced in a conduit as employed in one embodiment of this invention.

Referring to FIG. 1 liner 11 is illustrated with its external surface sealingly engaging conduit 13. Liner 11 is ordinarily substantially cylindrical and has an internal cylindrical passageway and has end portions at each end of the passageway against which a retaining means can engage. Liner 11 may be emplaced within conduit 13 by any of the well known means. One particularly satisfactory method and apparatus for setting liner 11 in conduit 13 is described in copending application Ser. No. 878,108; "Conduit Liner for Wellbore and Method and Apparatus for Setting Same", inventors Harrold Owen, Wayne O. Rosenthal, and James Douglas Young; filed Nov. 19, 1969. That application describes in detail how liner 11 can be positioned in conduit 13 intermediate a swage means and a setting sleeve, and the swage means drawn through the liner to force it outwardly into sealing engagement with conduit 13 by a setting tool suspended on a wire line. Other methods of setting liners such as liner 11 includes detonating explosive within the liner, expanding the liner outwardly by means of mechanical or hydraulic reamers into engagement with the conduit 13, and driving the swage means downwardly therethrough to expand it outwardly into engagement with conduit 13. As illustrated, liner 11 has, in its top end 15, notches 17. Notches 17 are not absolutely necessary but are useful in preventing rotation of the sealing plug, as indicated hereinafter. Additionally, it is helpful if top end 15 includes an inverted frustoconical section 19 to facilitate entry of subsequent apparatus into liner 11.

Liner 11 can be emplaced at any point within conduit 13 at any time in the life history of the well by means of wire line assembly and without the expense of bringing in a rig to handle strings of conduit.

Figure 2:
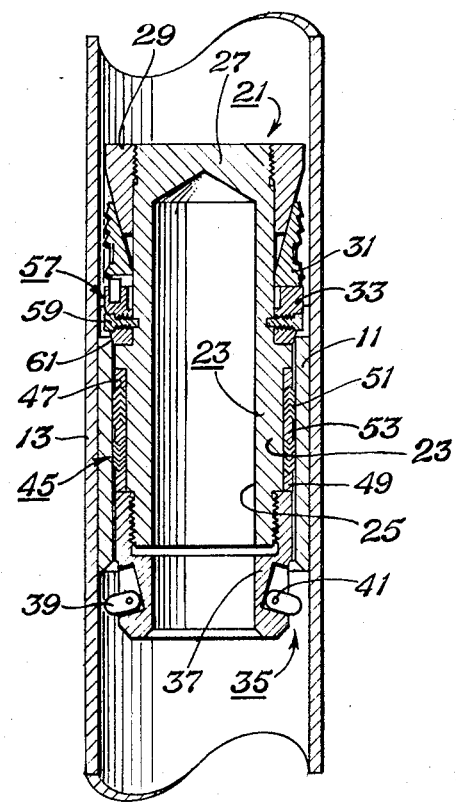
FIG. 2 illustrates a partial cross sectional view of a sealing plug that has been emplaced through the liner of FIG. 1 but has not had a force directed against either side thereof.

Once liner 11 is in place, the sealing plug may be simply flowed downwardly through conduit 13 to pass into and seat in liner 11. The sealing plug comprises a body portion adapted to pass within the liner, a lower retainer means for retaining it in position, a sealing means for sealing the annular passageway between the sealing plug and the liner, and an upper retaining means for preventing the sealing plug from passing downwardly through the liner. As illustrated in FIG. 2, sealing plug 21 has been passed into liner 11. Sealing plug 21 has a body portion 23 comprising a hollow shank 25 terminating in a solid top portion 27.

Top portion 27 is connected, as by threaded connection, with a setting section 29 having a portion of its exterior with an inverted frustoconical external configuration. Slips 31 are provided contiguous setting section 29, and intermediate it and upper retaining means such as ring 33. Slips 31 are for engaging conduit 13 when setting section 29 is moved downwardly within slips 31, held at a given depth by ring 33.

Figure 3:
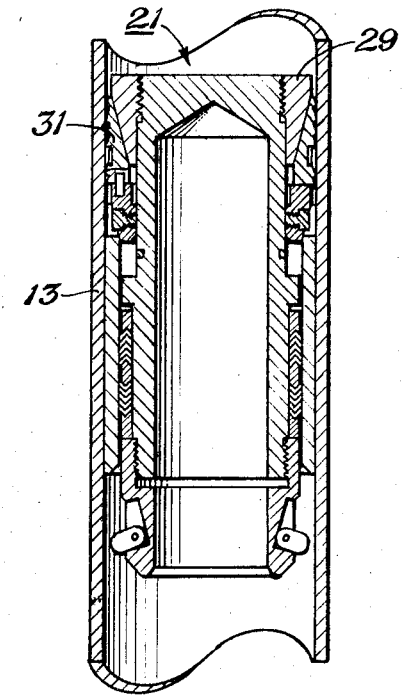
FIG. 3 is a partial cross sectional view showing the sealing plug of FIG. 2 after a force has been directed against the top of the plug to force it downwardly to set the slips.

As illustrated in FIG. 3, when a force is directed against the top of sealing plug 21, it is moved downwardly, moving setting section 29 within slips 31 and moving slips 31 outwardly into engagement with conduit 13.

Figure 4:
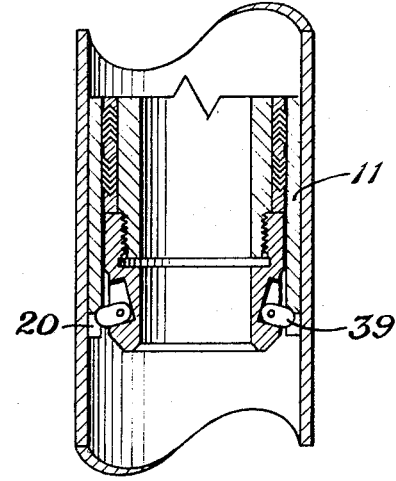
FIG. 4 is a partial cross sectional view of the sealing plug of FIG. 2 after a force has been directed against the bottom of the plug to force it upwardly to engage a lower retaining means with the liner having notches in its lower end.

Connected with the body portion 23 are lower retainer means 35. Lower retainer means 35 are normally in a retaining position protruding beyond the periphery of the body portion for preventing the sealing plug from being moved upwardly through the liner, but are adapted to be moved inwardly for passing through the liner when inserted from the top downwardly. Specifically, an annular holder 37 is affixed to body portion 23 as by threaded connection and has dogs 39 eccentrically and pivotally mounted by way of suitable connection like pins 41 such that the force of gravity retains dogs 39 in a normally retaining position. That is, the external ends of dogs 39 protrude beyond the outside diameter of the body portion 23. As can be seen, however, when the sealing plug is inserted into the liner from the top, the outer end of dogs 39 will be pushed inwardly by the walls of the passageway through liner 11 and allow the sealing plug to be inserted therethrough; after which dogs 39 fall into retaining position again. When a force is exerted against the sealing plug from beneath it, the dogs 39 are forced into engagement with the bottom end of liner 11 as illustrated in FIG. 4. In this way the sealing plug is retained in position to hold the force or means such as fluid exerting a pressure therebeneath.

Referring to FIG. 2, sealing means 45 extends annularly around body portion 23 and is adapted for sealingly engaging both the liner and the body portion for sealing the annular passageway therebetween. Ordinarily, the annular passageway will be small since the body portion substantially blocks the passageway through the liner. Sealing means 45 may comprise any satisfactory compressible, or resilient, material positioned within a recess in the body portion and capable of effecting a seal with the internal walls of the liner and with the external walls of the body portion. Normally, a resilient material is employed that has an outer diameter slightly greater than the internal diameter of the liner and is adapted to be slightly compressed when inserted therewithin. It has been found that end retainers 47 and 49 can be emplaced above and below vee packing (V-type packing) and effect the desired seal. Preferably, a plurality of rings of vee packing are employed with an intermediate spacer 53 therebetween in order to seal against a differential pressure from either direction. Any other suitable means of sealing; such as, o-rings; may be employed.

Upper retaining means 57 may consist essentially of means such as ring 33 for engaging the top end of the liner to prevent the sealing plug from being moved downwardly through the liner by application of a force on the top thereof. Specifically, ring 33 may be releasably connected to the body portion, as by shearable set screws 59. Ring 33 may have a chamfered outer edge 61 where the liner 11 has a frustoconical section 19, since engagement is thereby facilitated. Also preferably, the heads of set screws 59 are small enough in dimensions to fit within notches 17 to thereby become antirotation lugs to prevent rotation of the sealing plug 21 within liner 11, when the sealing plug is being drilled out. The upper retaining means may in some applications be simply protrusions on the body portion 27 which engage the upper end portion of the sleeve 11 to prevent downward movement of the body 27 through the sleeve 11, without slips and setting section.

In operation, liner 11 is emplaced in conduit 13. Sealing plug 21 is then dropped into conduit 13 through suitable means; such as, a conventional valve and lubricator at the surface; and allowed to drop by gravity through tubing 13 to pass within liner 11. If desired, fluid pressure can be applied on top of sealing plug 21 to drive it downwardly through conduit 13 more rapidly and to more positively effect seating within liner 11. As indicated hereinbefore upon entry into liner 11, dogs 39 are cammed inwardly to allow passage therethrough. Sealing means 45 may also be compressed slightly upon entry into the passageway through liner 11. When dogs 39 emerge from the bottom of liner 11, they assume their normal retaining position, through the action of gravity causing them to swing outwardly about their pivotal mounting. Ring 33 engages the top of liner 11. In the event that liner 11 has notches 17 at its top, it is likely that the turbulence of the fluid flowing or attempting to flow past sealing plug 21 during its seating will cause it to rotate until the heads of set screws 59 seat within notches 17 to prevent further rotation.

If the pressure is continued to be applied from the top after ring 33 engages the top of liner 11, setting section 29 is moved downwardly to expand the slips 31 outwardly into engagement with conduit 13 to help retain the sealing plug and liner in place and resist the force caused by the pressure above it.

On the other hand, if the pressure is released above the sealing plug such that a higher pressure occurs below the sealing plug, it is forced into the position illustrated in FIG. 4 in which dogs 39 in their retaining position engage the bottom of liner 11 to hold the sealing plug in place.

In any event, heads of set screws 59 engage the top of liner 11 and prevent rotation of the sealing plug relative to the liner when the sealing plug is being drilled out.

If desired, the liner 11 may have notches at its lower end similar to those at its top end (see FIG. 4) so that dogs 39 will engage the notches 20 to prevent rotation of the plug body when it is being drilled out and fluid pressure beneath the plug exceeds that above the plug.

The materials of construction usually employed in a given environment are satisfactory for making the sealing plug. For example, the body and the majority of the elements of the sealing plug may be made of conventional cast iron in an ordinary well producing hydrocarbonaceous fluids. In the event that one or more portions of the seal will be exposed to corrosive environments; such as sour fluids in a well; they may be made of corrosion-resistant materials such as stainless steel or titanium. For example, the liner 11, holder 37, dogs 39 and pins 41 may be made of the corrosion-resistant materials if the fluid below the sealing plug is a corrosive fluid such as a hydrocarbonaceous liquid or gas containing hydrogen sulfide. As indicated, a resilient material suitable for the fluids in the well will serve as material from which to manufacture the sealing means. For example, neoprene or other oil resistant resilient material such as "Hycar" may be employed in manufacturing the resilient portion of a sealing means such as the vee packing or the o-ring.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A sealing plug adapted for sealing a passageway within a liner in a conduit comprising:
   a. a body portion adapted to pass within said passageway within said liner and substantially block said passageway;
   b. lower retainer means connected with said body portion and normally in a retaining position protruding beyond the periphery of said body portion for preventing said sealing plug from being moved upwardly through said liner but adapted to be moved inwardly for passing downwardly through said liner;
   c. sealing means extending annularly around said body portion and adapted for sealingly engaging said liner and said body portion for sealing any annular passageway therebetween;
   d. upper retaining means comprising means for engaging said liner for preventing said sealing plug from being moved downwardly through said liner; and
   e. a setting section having an inverted frustoconical external configuration connected to the upper end of said body portion, slips disposed contiguous said setting section and intermediate it and said upper retaining means to be set against the walls of said conduit when said setting section moves downwardly within said slips retained against said upper retaining means.

2. The sealing plug of claim 1 wherein said body portion comprises a hollow shank terminating in a solid top portion.

3. The sealing plug of claim 1 wherein said upper retaining means comprises a plurality of lugs fixedly connected to said body portion and adapted to engage notches in the top of said liner to prevent rotation of said plug.

4. In apparatus for sealing off a conduit penetrating subterranean formations, the improvement comprising:
   a. a liner sealingly engaging the walls of said conduit and having a cylindrical internal passageway and having engageable ends adjacent each end of said passageway; and
   b. a sealing plug adapted to seal said passageway within said liner, said sealing plug comprising:
      i. a body portion adapted to pass within said passageway within said liner and substantially block said passageway;
      ii. lower retainer means connected with said body portion and normally in a retaining position protruding beyond the periphery of said body portion for preventing said sealing plug from being moved upwardly through said liner but adapted to be moved inwardly for passing downwardly through said liner;
      iii. sealing means extending annularly around said body portion and adapted for sealingly engaging said liner and said body portion for sealing any annular passageway therebetween;
      iv. upper retaining means comprising means for engaging said liner for preventing said sealing plug from being moved downwardly through said liner; and
      v. a setting section having an inverted frustoconical external configuration connected to the upper end of said body portion, slips disposed contiguous said setting section and intermediate it and said upper retaining means to be set against the walls of said conduit when said setting section moves downwardly within said slips retained against said upper retaining means.

5. The sealing plug of claim 4 wherein said body portion comprises a hollow shank terminating in a solid top portion.

6. The sealing plug of claim 4 wherein said lower retainer means comprise dogs normally held in a retaining position but adapted to cam inwardly for passage downwardly through said liner but to move outwardly once emplaced through said liner to prevent upward movement back through said liner and wherein the liner has notches at its lower end and said dogs seat in said notches to prevent rotation of said plug.

7. The sealing plug of claim 4 wherein said upper retaining means comprises a plurality of lugs fixedly connected to said body portion and adapted to engage notches in the top of said liner to prevent rotation of said plug.

* * * * *